US006193070B1

(12) United States Patent
Rowney et al.

(10) Patent No.: US 6,193,070 B1
(45) Date of Patent: Feb. 27, 2001

(54) APPARATUS FOR SEPARATING SOLIDS DRILLING FLUIDS

(75) Inventors: Brian Raymond Rowney, Sexsmith; David King, Calgary, both of (CA)

(73) Assignee: Grand Tank (International) Inc. (CA)

( * ) Notice: Subject to any disclaimer, the term of this patent is extended or adjusted under 35 U.S.C. 154(b) by 0 days.

(21) Appl. No.: 09/399,901

(22) Filed: Sep. 21, 1999

Related U.S. Application Data

(62) Division of application No. 08/951,843, filed on Oct. 16, 1997.

(51) Int. Cl.[7] .................................................... B03B 1/00

(52) U.S. Cl. ...................... 209/5; 209/3; 209/4; 209/208; 209/210; 209/724; 209/725; 210/521; 210/206; 210/205

(58) Field of Search ............................. 209/3, 4, 5, 208, 209/210, 724, 725; 210/521, 320, 167, 168, 523, 206, 205

(56) References Cited

U.S. PATENT DOCUMENTS

| 357,103 | * | 2/1887 | Snyder . | |
|---|---|---|---|---|
| 1,434,386 | | 11/1922 | Hilleke . | |
| 2,013,105 | * | 9/1935 | Mackillican | 209/155 |
| 2,078,752 | | 4/1937 | Christensen | 209/464 |
| 2,156,333 | * | 5/1939 | Cross et al. | 209/155 |
| 2,756,965 | | 7/1956 | Howe | 255/1.8 |
| 2,799,645 | * | 7/1957 | Musgrove | 210/42 |
| 2,817,440 | * | 12/1957 | Casner et al. | 209/208 |
| 2,868,384 | * | 1/1959 | Puddington | 210/521 |
| 3,196,141 | * | 7/1965 | Bradford | 260/93.7 |
| 3,577,341 | * | 5/1971 | Keith, Jr. et al. | 210/53 |
| 3,737,037 | | 6/1973 | Bone, III | 210/73 |

(List continued on next page.)

FOREIGN PATENT DOCUMENTS

| 584368 | | 10/1959 | (CA) . | |
|---|---|---|---|---|
| 632015 | | 12/1961 | (CA) . | |
| 1332715 | | 10/1994 | (CA) . | |
| 1019035 | | 2/1966 | (GB) . | |
| 2067427 | | 7/1981 | (GB) . | |
| 0947064 | * | 7/1982 | (SU) | 210/320 |
| 92/19348 | * | 11/1992 | (WO) . | |

OTHER PUBLICATIONS

Warren, Brent K. et al., Slope Bottom Tanks Reduce Drilling Liquid Waste Volumes, Paper No. 93–403, CADE/CAODC Spring Drilling Conference, Apr. 14–16, 1993, Calgary, Alberta, pp. 1–10.

Fair, Gordon Maskew et al., *Elements of Water Supply and Wastewater Disposal*, 2nd ed., 1971 pp. 323, 550–552, 602, 603, 607, 608.

*Primary Examiner*—Donald P. Walsh
*Assistant Examiner*—David Jones
(74) *Attorney, Agent, or Firm*—Oyen Wiggs Green & Mutala

(57) ABSTRACT

A solids separation system may be used to separate solids, such as cuttings from drilling fluids used in well drilling operations. The system includes a settling tank having transverse baffles defining a fluid receiving chamber, a fluid output chamber and one or more intermediate chambers. Fluid introduced into the fluid receiving chamber can flow in a sinuous path through apertures in the baffles to the fluid output chamber. Solids settle to the bottom of the settling tank. A material conveyor, preferably an auger, extends along a bottom surface of the settling tank to an outlet port in the fluid receiving chamber. A centrifuge is connected to the output port to receive fluid in which solids have been concentrated. Fluid output from the centrifuge is reintroduced into the settling tank. The apparatus and method of the invention permit a single centrifuge to be used to handle a higher volume of fluid than is possible with conventional methods and apparatus. This provides significant cost savings.

34 Claims, 4 Drawing Sheets

U.S. PATENT DOCUMENTS

| | | | |
|---|---|---|---|
| 3,901,804 | * 8/1975 | Ohuchi et al. | 210/50 |
| 4,036,603 | * 7/1977 | Bernet et al. | 44/13 |
| 4,192,392 | 3/1980 | Messines et al. . | |
| 4,192,738 | * 3/1980 | Colombo et al. | 209/5 |
| 4,274,963 | 6/1981 | Purvis | 210/320 |
| 4,306,967 | 12/1981 | Trautwein . | |
| 4,319,410 | * 3/1982 | Heilhecker et al. | 34/75 |
| 4,350,596 | * 9/1982 | Kennedy, Jr. | 210/708 |
| 4,367,145 | 1/1983 | Simpson et al. | 210/241 |
| 4,482,459 | * 11/1984 | Shiver | 210/639 |
| 4,526,687 | 7/1985 | Nugent | 210/202 |
| 4,571,296 | 2/1986 | Lott . | |
| 4,599,117 | * 7/1986 | Luxemburg | 134/25.1 |
| 4,636,308 | 1/1987 | Summers | 210/195.1 |
| 4,710,290 | 12/1987 | Briltz | 210/199 |
| 4,750,274 | * 6/1988 | Erdman, Jr. et al. | 34/39 |
| 5,093,008 | * 3/1992 | Clifford, III | 210/725 |
| 5,415,776 | 5/1995 | Homan | 210/519 |
| 5,425,188 | 6/1995 | Rinker | 37/317 |
| 5,458,770 | * 10/1995 | Fentz | 210/168 |
| 5,476,582 | * 12/1995 | Camping | 210/85 |
| 5,570,749 | 11/1996 | Reed | 210/180 |
| 5,571,408 | 11/1996 | Rising | 210/167 |
| 5,814,230 | 9/1998 | Willis et al. | 210/710 |
| 5,882,524 | * 3/1999 | Storey et al. | 210/712 |

\* cited by examiner

APPARATUS FOR SEPARATING SOLIDS DRILLING FLUIDS

This is a division of application Ser. No. 08/951,843, filed Oct. 16, 1997.

TECHNICAL FIELD

This invention relates to separators for removing solids from fluids. The methods and apparatus of the invention have particular application in removing solids from drilling fluids used in well drilling operations.

BACKGROUND

Wells for recovering oil, gas and the like are typically drilled by a drilling rig which includes a hollow drill string with a bit at its lower end. As the drill string is rotated, drilling fluids are pumped down through a channel in the drill string. The drilling fluids pass through the bit and return to the surface on the outside of the drill string. The fluids carry cuttings from the drilling operation to the surface. The drilling fluids are recovered at the surface and then recycled. Water may be used as drilling fluid in shallow drilling. In deeper wells the drilling fluids are denser drilling muds of various compositions as is known to those skilled at drilling wells.

Various apparatus and methods are known for removing cuttings and other undesired solids from drilling fluids so that the drilling fluids may be reused. A widely used method for removing solids from drilling fluid is to pass the recovered drilling fluid through a centrifuge. The centrifuge separates the undesirable solids from the drilling fluid. The drilling fluid output from the centrifuge may then be reused. Because of the volume of drilling fluid used in a typical well drilling operation, it is necessary to either have a very large centrifuge system or to provide multiple centrifuges. The costs of having a centrifuge system on site and operating the centrifuge system are significant. There is a need for a solids separation system capable of removing solids from drilling fluids which can be provided and operated at reduced cost relative to prior art systems.

SUMMARY OF THE INVENTION

It is an object of this invention to provide methods and apparatus for removing solids from drilling fluids which are more cost effective than prior art systems.

One aspect of the invention provides a method for recycling fluid in a drilling operation. The method comprises the steps of: receiving a stream of fluid containing solids; introducing the fluid and a flocculating agent into a settling tank, the tank comprising a plurality of compartments and a material conveyor extending through the compartments in a lower portion of the tank; allowing the fluid to flow along the settling tank in a first direction to a collection area while allowing solids to settle to the bottom of the tank and operating the material conveyor to carry settled solids in a second direction opposite to the first direction toward an output port in the tank; withdrawing fluid from the collection area; and, withdrawing a mixture of solids and fluid from the outlet port.

Another aspect of the invention provides apparatus for removing solids from fluids. The apparatus comprises a settling tank and a centrifuge having an inlet in fluid communication with an output port on the settling tank. The settling tank comprises a fluid receiving chamber at a first end of the tank; a fluid output chamber at a second end of the tank; a plurality of transverse apertured baffles extending across the tank between the fluid receiving chamber and the fluid output chamber, the baffles defining one or more intermediate chambers between the fluid receiving chamber and the fluid output chamber; a material conveyor extending along a lower side of the tank to an outlet port at the first end of the tank, the material conveyor comprising a motor driving the material-conveyor to carry materials in a direction toward the outlet port; and, a fluid outlet at the second end of the tank.

BRIEF DESCRIPTION OF THE DRAWINGS

In drawings which illustrate non-limiting embodiments of the invention.

DESCRIPTION

Figure 1:
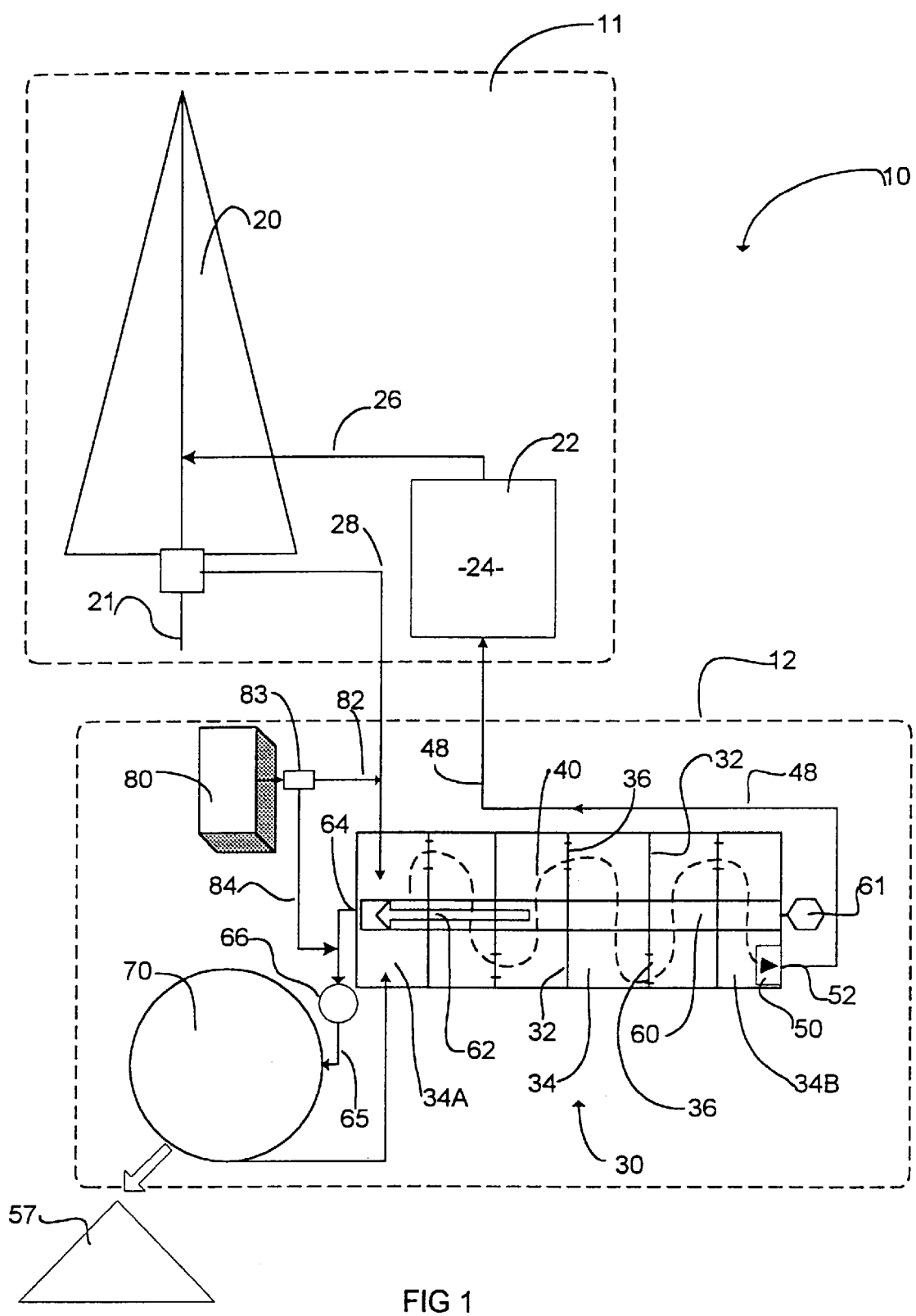
FIG. 1 is a schematic view of a well drilling system incorporating a solids separation apparatus according to the invention.

FIG. 1 is a schematic showing a well drilling system 10 which includes a drill rig 11 and a solids separation system 12 according to the invention. Drill rig 11 includes a tower 20 supporting a drill string 21 which is capable of being driven into the ground by conventional means well known to those skilled in the art. A tank 22 in drill rig 11 contains drilling fluid 24. The methods of the invention are most effective when drilling fluid 24 is water. However, the invention can also be applied to removing solids from denser drilling muds.

Drilling fluid 24 is pumped through a conduit 26 into drill string 21. Fluid 24 flows downward through the lower end of drill string 21 where it picks up cuttings from the drilling operation. Fluid 24 flows back to the surface beside drill string 21 carrying the cuttings with it. Fluid 24 is collected when it reaches or nears the surface. The operation of a drill rig 11 using a drilling fluid 24 is well known to those skilled in the art.

Collected fluid 24 passes through conduit 28 to solids separation system 12 which removes solids from fluid 24 and then returns fluid 24 through conduit 48 to tank 22 for reuse.

Solids separation system 12 includes a settling tank 30. Settling tank 30 has a number of transverse baffles 32 which divide tank 30 into a number of chambers 34. Chambers 34 may conveniently be made to have the same volumes. Chambers 34 may typically have volumes in the range of 2,000 liters to 6,000 liters and most typically will have volumes of about 4,000 liters. The invention may be practised with chambers 34 having volumes outside of this range.

Baffles 32 have apertures 36 to permit fluid 24 to flow through tank 30 from an input chamber (or "receiving chamber") 34A at a first end of tank 30 to an output chamber 34B at a second end of tank 30 through a number of intermediate chambers 34. Apertures 36 are staggered on alternating sides of tank 30 so that fluid 24 follows a sinuous path 40 as it flows from input chamber 34A to output chamber 34B through intermediate chambers 34.

A sump 50 is preferably provided in output chamber 34B. Sump 50 may comprise, for example, a small chamber having a top edge 50A (FIG. 3) slightly below the top level of fluid 24 in tank 30. Fluid 24 flows into sump 50 over top edge 50A. Fluid 24 is collected in sump 50 and passes through an outlet 52, which is typically in a side or bottom wall of sump 50, into a conduit 48 which returns fluid 24 to tank 22 in drilling rig 11 from where it can be reused.

As fluid 24 flows slowly along path 40 through tank 30, solids suspended in fluid 24 settle to the bottom of tank 30. A material conveyor extends along the bottom of tank 30. The material conveyor is preferably an auger 60 driven by a motor 61 so as to move solids in a direction 62 opposite to the flow of fluid 24 along path 40 through tank 30. Auger 60 extends to an outlet port 64 at the first end of tank 30. Auger 60 is preferably generally horizontal.

Suspended solids which fall out of fluid 24 are therefore carried by auger 60 to outlet port 64 against the flow of fluid 24 in tank 30. Outlet port 64 passes through an end wall of tank 30. Outlet port 64 is at the opposite end of tank 30 from outlet 52. Outlet port 64 is preferably below the typical fluid level F which is maintained in tank 30 when solids separation system 12 is operating.

The settled solids 57 carried by auger 60 pass through outlet port 64. Fluid 24 containing the settled solids 57 delivered by auger 60 is carried by a conduit 65 and a pump 66 to a centrifuge 70 which separates solids 57 from fluid 24 and returns cleaned fluid 24 to tank 30. Centrifuge 70 may be of the type typically used for separating solids from drilling fluids. As described below, the capacity of centrifuge 70 may be significantly lower than would be required if centrifuge 70 were used in a prior art system wherein the entire flow of fluid 24 passes through centrifuge 24.

The concentration of solids 57 in conduit 65 is significantly greater than the concentration of solids 57 in conduit 28. Preferably, the cleaned fluid 24 from the fluid output of centrifuge 70 is reintroduced into receiving chamber 34A.

Most preferably, a flocculating agent or "flocculant", such as a suitable polymerizing material is introduced from a tank 80 through a conduit 82 into conduit 28 before fluid 24 enters tank 30. As is known in the art, the flocculating agent encourages suspended solids to settle. Polymer tank 80 may conveniently be a separate compartment built into settling tank 30. Polymer tank 80 should include a mixer (not shown) to keep the flocculating agent stirred. Flocculating agent is also preferably introduced through a conduit 84 into conduit 65 upstream from centrifuge 70. This aids the centrifugal separation process, as is known in the art. A suitable metering system 83 controls the rate at which flocculating agent is introduced into conduits 28 and 65.

Solids separating apparatus 12 has the advantage that it concentrates solids 57 before they are provided to centrifuge 70. The capacity of centrifuge 70 may therefore be much smaller than the capacity that would be required to treat all of fluid 24 coming through conduit 28 in a centrifuge. Typically, only one centrifuge 70 is needed to treat a volume of fluid 24 which would otherwise need two, and perhaps three centrifuges of the same size. This results in a significant reduction in costs to the operator of well drilling system 10.

Centrifuge 70 should be of a size suited to handle the volume of fluid which is expected to flow through it. A BRAMATH™ model 1850 centrifuge made by Bramath Ltd. of Calgary, Alberta, Canada has been used successfully as centrifuge 70 in a solids separation system 12. In some applications in which the invention has been successfully used the flow rate of fluid 24 and solids 57 through centrifuge 70 is about 300 to 600 liters per minute and the flow rate of dirty fluid 24 entering tank 30 through conduit 28 is in the range of 100 to 2200 liters per minute. Under typical operating conditions the flow rate of fluid 24 through centrifuge 70 is only 25% to 50% of the flow rate of fluid 24 received at solids separation system 12. Of course, the invention is not limited to these flow rates.

Figure 2:
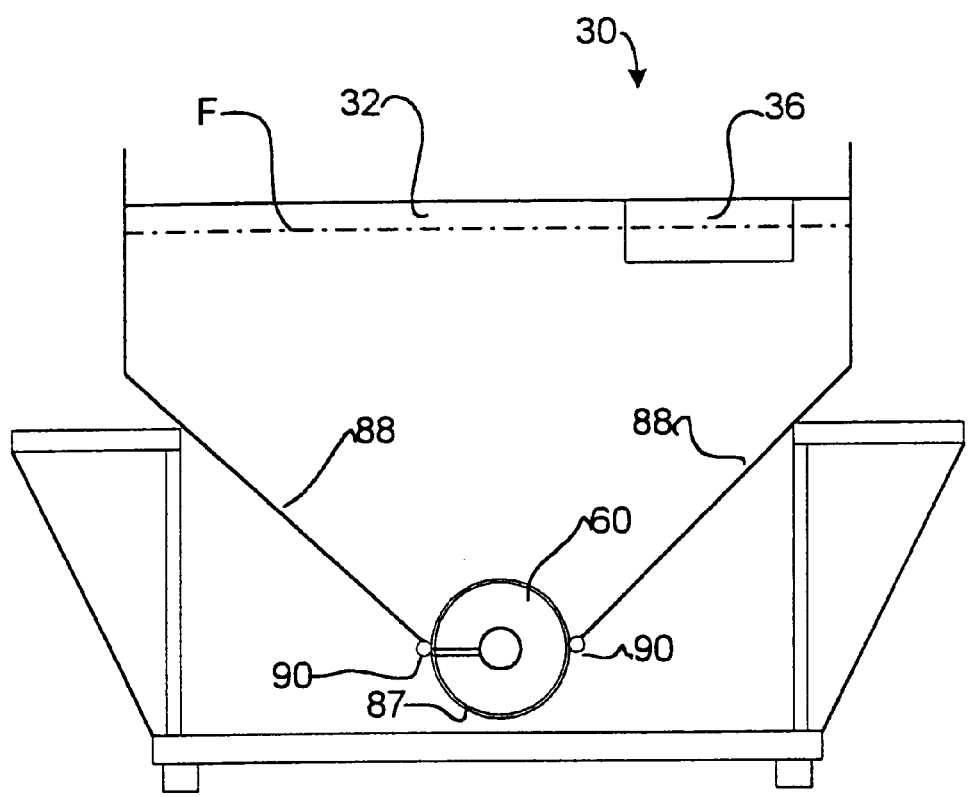
FIG. 2 is a transverse section through a settling tank for use in the invention.
Figure 3:
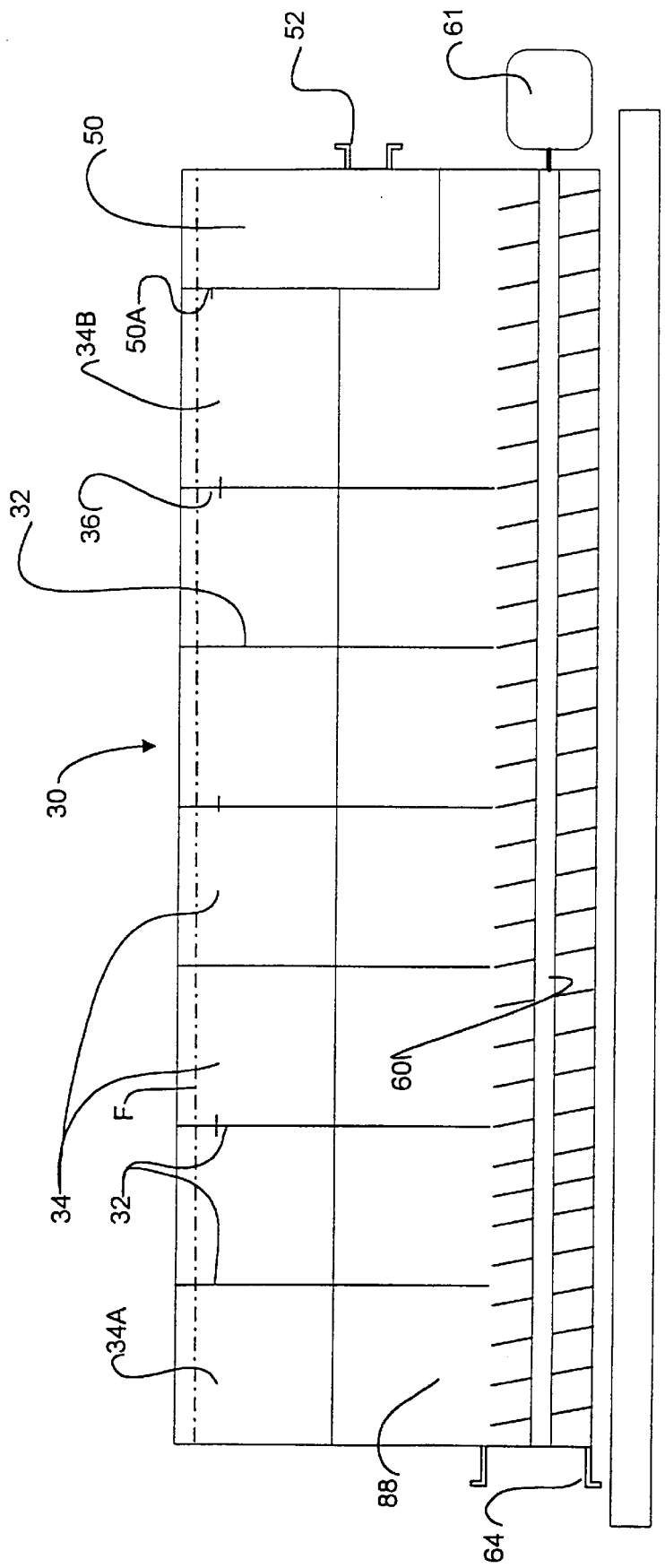
FIG. 3 is a longitudinal section through the settling tank of FIG. 2.

FIGS. 2 and 3 show sectional views through tank 30. As shown in FIG. 2, tank 30 preferably has a V-shaped section with auger 60 located in a channel 87 at the bottom of tank 30 between sloping walls 88. Each of baffles 32 is apertured to allow auger 60 to pass through it. Solids which settle on sloping walls 88 are carried by gravity to auger 60 which carries the settled solids to outlet port 64. The angle of walls 88 is not critical. Walls 88 should be steep enough to encourage solids 57 which settle on walls 88 to slide down into channel 87. Solids in channel 87 are moved along by auger 60 to outlet port 64.

If apparatus 12 is to be operated in a very cold environment then one or more heating elements 90 are preferably provided along side auger 60. Heating elements 90 may be used to melt any fluids which may freeze around auger 60 if apparatus 12 is left standing long enough for fluid 24 inside tank 30 to freeze around auger 60. Heating elements 90 may, for example, comprise one or more steam tubes extending longitudinally along an outer surface of tank 30 adjacent auger 60. The steam tubes may be connected to a source of steam such as a boiler on drill rig 11.

A prototype settling tank 30 which has been successfully tested and is currently preferred for use in the invention has 7 chambers 34 including fluid receiving chamber 34A and fluid output chamber 34B. Each chamber 34 has a surface area of approximately 42 square feet and a volume of approximately 4,000 liters. The rate of flow of fluid 24 through a tank of these dimensions is preferably maintained in the range of 0.1 cubic meters per minute to 2.2 cubic meters per minute for best results. Apertures 36 in the prototype tank 30 comprise rectangular openings 24 inches wide by 10 inches high. In the prototype system, auger 60 is about 9 inches in diameter. The pitch of Auger 60 in the prototype system is about 6 inches.

It is preferable that auger 60 should turn at a fairly slow speed to avoid stirring up sediments from the bottom of tank 30. Motor 61 may turn auger 60, for example, at a speed of approximately 10 to 20 rpm.

Figure 4:
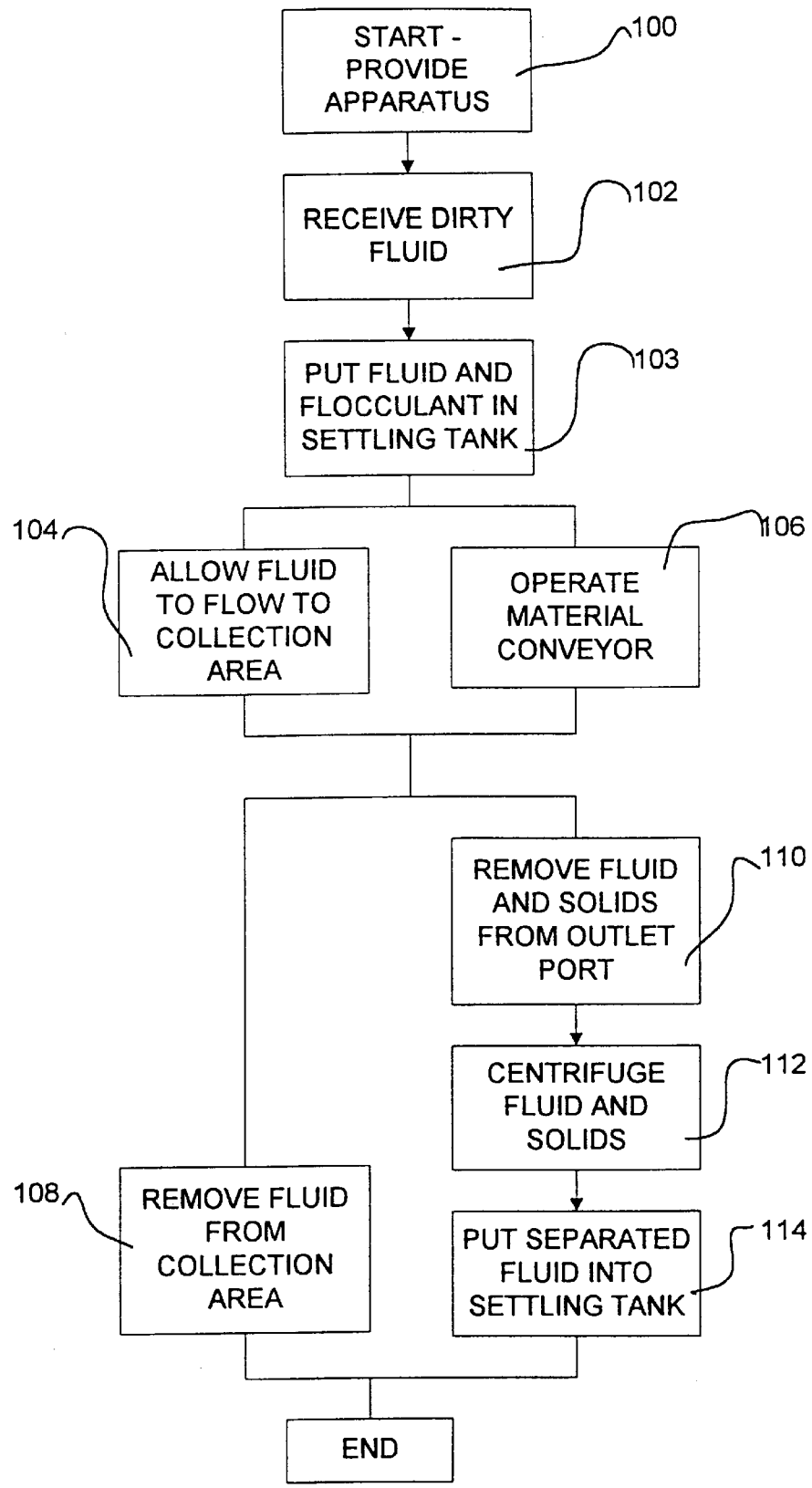
FIG. 4 is a flow chart illustrating steps in the method of the invention.

As shown in FIG. 4, the method of the invention begins by providing a solids separating settling tank comprising a material conveyor and a number of transverse baffles (step 100). A stream of fluid containing solids is then received at the solids separating apparatus (step 102). The fluid is mixed with a flocculating agent and introduced into a receiving area in the settling tank (step 103). The fluid and the flocculating agent may be introduced into the tank separately or together.

Next, the fluid is allowed to flow along the settling tank in a first direction to a collection area while solids settle toward the bottom of the tank (step 104). Step 104 preferably involves causing the fluid to flow in a sinuous path past baffles in the settling tank. At the same time, the material conveyor is operated to carry settled solids in a direction opposite to the first direction toward an output port in the tank (step 106). Most preferably, flow through the tank and the operation of the material conveyor both happen continuously. One or both of steps 104 and 106 could be carried out intermittently without departing from the invention.

Finally, cleaned fluids are withdrawn from the collection area (step 108) and a mixture of fluid and solids is withdrawn from the outlet port (step 110) and passed through a centrifuge (step 112) to separate the solids from the fluid. The cleaned fluid from the centrifuge is preferably reintroduced to the settling tank (step 114), most preferably into the receiving area of the settling tank. Preferably, steps 108 and 110 through 114 are carried out substantially continuously. However, either or both of steps 108 and 110 through 114 may be carried out intermittently without departing from the broad scope of the invention.

As will be apparent to those skilled in the art in the light of the foregoing disclosure, many alterations and modifications are possible in the practice of this invention without departing from the spirit or scope thereof. While the invention has been described in conjunction with a conventional drill rig, the invention may be used to remove solids from fluids produced by other drilling systems or to remove solids from fluids which have otherwise become mixed with solids. Construction details such as the slopes of walls 88, the exact dimensions of chambers 34, the volumes of chambers 34 and the dimensions and shapes of apertures 36 may also be varied without departing from the scope of the invention. Other suitable types of material conveyor may be used in place of auger 60. Accordingly, the scope of the invention is to be construed in accordance with the substance defined by the following claims.

What is claimed is:

1. Apparatus for removing solids from fluids, the apparatus comprising:
   (a) a settling tank comprising:
      (i) a fluid receiving chamber at a first end of the tank;
      (ii) a fluid output chamber at a second end of the tank;
      (iii) a plurality of transverse apertured baffles extending across the tank between the fluid receiving chamber and the fluid output chamber, the baffles defining one or more intermediate chambers between the fluid receiving chamber and the fluid output chamber;
      (iv) a material conveyor extending along a lower side of the tank to an outlet port at the first end of the tank, the material conveyor comprising a motor driving the material conveyor to carry materials in a direction toward the outlet port; and,
      (v) a fluid outlet at the second end of the tank; and,
   (b) a centrifuge comprising:
      (i) an inlet in fluid communication with the outlet port of the settling tank; and,
      (ii) a fluid outlet in fluid communication with the fluid receiving chamber of the settling tank.

2. The apparatus of claim 1 wherein the material conveyor comprises an auger.

3. The apparatus of claim 2 wherein the settling tank comprises sloping side walls and the auger extends in a channel between the sloping side walls.

4. The apparatus of claim 1 wherein the baffles are apertured on alternating sides of the settling tank, the apertures defining a sinuous fluid flow path through the settling tank.

5. The apparatus of claim 4 wherein the baffles are each penetrated by a rectangular aperture located near an upper edge of the baffle.

6. The apparatus of claim 5 wherein the material conveyor comprises an auger.

7. The apparatus of claim 6 wherein the settling tank comprises sloping side walls and the auger extends in a channel between the sloping side walls.

8. The apparatus of claim 7 comprising a conduit extending from a fluid output of the centrifuge to the fluid receiving chamber.

9. The apparatus of claim 8 comprising a heating element extending along the settling tank adjacent the auger.

10. The apparatus of claim 9 wherein the heating element comprises one or more steam tubes connectible to a source of steam.

11. The apparatus of claim 8 wherein the settling tank has exactly five intermediate chambers between the fluid receiving chamber and the fluid output chamber.

12. The apparatus of claim 8 wherein the intermediate chambers are generally equal in volume.

13. The apparatus of claim 8 wherein the intermediate chambers each have a volume in the range of 2000 liters to 6000 liters.

14. The apparatus of claim 1 comprising a tank for holding a flocculating agent and a metering system adapted to deliver flocculating agent from the tank into the fluid receiving chamber.

15. Apparatus for removing solids from fluids, the apparatus comprising:
   (a) a settling tank comprising:
      (i) a fluid receiving chamber at a first end of the tank;
      (ii) a fluid output chamber at a second end of the tank;
      (iii) a plurality of transverse apertured baffles extending across the tank between the fluid receiving chamber and the fluid output chamber, the baffles defining one or more intermediate chambers between the fluid receiving chamber and the fluid output chamber, the baffles each being penetrated by a rectangular aperture located near an upper edge of the baffle, the baffles being apertured on alternating sides of the settling tank, the apertures defining a sinuous fluid flow path through the settling tank;
      (iv) the intermediate chambers each having a volume in the range of 2000 liters to 6000 liters;
      (v) a material conveyor extending along a lower side of the tank to an outlet port at the first end of the tank, the material conveyor comprising a motor driving the material conveyor to carry materials in a direction toward the outlet port. The material conveyor comprising an auger;
      (vi) sloping side walls wherein the auger extends in a channel between the sloping side walls; and,
      (vii) a fluid outlet at the second end of the tank;
   (b) a centrifuge having an inlet in fluid communication with the output port;
   (c) a conduit extending from a fluid output of the centrifuge to the fluid receiving chamber; and,
   (d) a metering system adapted to deliver flocculating agent into both the fluid receiving chamber and the centrifuge inlet.

16. The apparatus of claim 1 wherein the outlet port is located below an operating fluid level in the tank.

17. The apparatus of claim 16 wherein the material conveyor extends generally horizontally.

18. The apparatus of claim 17 wherein the material conveyor comprises an auger and a motor for rotating the auger.

19. Apparatus for removing solids from fluids, the apparatus comprising:
   (a) a settling tank comprising:
      (i) a fluid receiving chamber at a first end of the tank;
      (ii) a fluid output chamber at a second end of the tank;
      (iii) a plurality of transverse apertured baffles extending across the tank between the fluid receiving chamber and the fluid output chamber, the baffles defining one or more intermediate chambers between the fluid receiving chamber and the fluid output chamber;

(iv) a material conveyor extending along a lower side of the tank to an outlet port at the first end of the tank, the material conveyor comprising a motor driving the material conveyor to carry materials in a direction toward the outlet port; and, (v) a fluid outlet at the second end of the tank; and, (b) a centrifuge having an inlet in fluid communication with the outlet port of the settling tank; and, (c) a tank for holding a flocculating agent and a metering system adapted to deliver flocculating agent from the tank into the fluid receiving chamber and the centrifuge inlet.

20. Apparatus for removing solids from drilling fluids, the apparatus comprising:

(a) a settling tank comprising:

(i) a fluid receiving chamber at a first end of the tank;

(ii) a fluid output chamber at a second end of the tank;

(iii) a plurality of transverse apertured baffles extending across the tank between the fluid receiving chamber and the fluid output chamber, the baffles defining one or more intermediate chambers between the fluid receiving chamber and the fluid output chamber;

(iv) a material conveyor extending along a lower side of the tank to an outlet port at the first end of the tank, the material conveyor comprising a motor driving the material conveyor to carry materials in a direction toward the outlet port; and, (v) a fluid outlet at the second end of the tank;

(b) a conduit connected to deliver drilling fluid from a drilling rig to the fluid receiving chamber; and, (c) a centrifuge having an inlet in fluid communication with the output port.

21. The apparatus of claim 20 comprising an agent tank for holding a flocculating agent and a metering system adapted to deliver flocculating agent from the agent tank into the fluid receiving chamber.

22. The apparatus of claim 21 wherein the metering system is adapted to deliver flocculating agent into both the fluid receiving chamber and the centrifuge inlet.

23. The apparatus of claim 20 wherein the material conveyor comprises an auger.

24. The apparatus of claim 23 wherein the settling tank comprises sloping side walls and the auger extends in a channel between the sloping side walls.

25. The apparatus of claim 20 wherein the baffles are apertured on alternating sides of the settling tank, the apertures defining a sinuous fluid flow path through the settling tank.

26. The apparatus of claim 25 wherein the baffles are each penetrated by a rectangular aperture located near an upper edge of the baffle.

27. The apparatus of claim 26 wherein the material conveyor comprises an auger.

28. The apparatus of claim 27 wherein the settling tank comprises sloping side walls and the auger extends in a channel between the sloping side walls.

29. The apparatus of claim 28 comprising a conduit extending from a fluid output of the centrifuge to the fluid receiving chamber.

30. The apparatus of claim 29 comprising a heating element extending along the settling tank adjacent the auger.

31. The apparatus of claim 30 wherein the heating element comprises one or more steam tubes connectable to a source of steam.

32. The apparatus of claim 29 wherein the settling tank has exactly five intermediate chambers between the fluid receiving chamber and the fluid output chamber.

33. The apparatus of claim 29 wherein the intermediate chambers are generally equal in volume.

34. The apparatus of claim 29 wherein the intermediate chambers each have a volume in the range of 2000 liters to 6000 liters.

* * * * *